US006232918B1

United States Patent
Wax et al.

(10) Patent No.: US 6,232,918 B1
(45) Date of Patent: May 15, 2001

(54) ANTENNA ARRAY CALIBRATION IN WIRELESS COMMUNICATION SYSTEMS

(75) Inventors: Mati Wax, San Ramon; Sriram Jayaraman, San Bruno; Oliver Hilsenrath, Alamo, all of CA (US)

(73) Assignee: US Wireless Corporation, San Ramon, CA (US)

( * ) Notice: Subject to any disclaimer, the term of this patent is extended or adjusted under 35 U.S.C. 154(b) by 0 days.

(21) Appl. No.: 09/153,093

(22) Filed: Sep. 14, 1998

Related U.S. Application Data

(63) Continuation-in-part of application No. 08/780,565, filed on Jan. 7, 1997, now Pat. No. 6,026,304.

(51) Int. Cl.$^7$ ............................... H01Q 3/00; G01S 3/16
(52) U.S. Cl. ........................... 342/360; 342/174; 342/378
(58) Field of Search ................................... 342/360, 378, 342/451, 453, 465, 174, 173; 343/703

(56) References Cited

PUBLICATIONS

Leshem, Amir et al, "Array Manifold Measurement in the Presence of Multipath", 1997 Int'l IEEE Conf. on Acoustics, Speech and Signal Processing, Apr. 1997, pp. 3525–2528.*
Asztely, David et al, "Auto Calibration For Signal Separation with Uniform Linear Arrays", 1997 13th Int'l. Conf. on Digital Signal Processing Proceedings, vol. 1, Jul. 1997, pp. 403–406.*
Ng, Boon Chong et al, "Sensor Array Calibration Using a Maximum Likelihood Approach", IEEE Trans. on Antennas and Propagation, vol. 44, No. 6, Jun. 1996, pp. 827–835.*
See, C.M.S., "Method for array calibration in high–resolution sensor array processing", IEE Proc.–Radar, Sonar, Navig., vol. 142, No. 3, Jun. 1996, pp. 90–96.*
Jeng, S.S. et al, "Measurements of Spatial Signature of an Antenna Array", 6th Int'l Symposium on Personal, Indoor and Mobile Radio Comm. PIMRC '95. pp. 669–672.*
Koerber, M.A. et al, "Array Calibration by Fourier Series Parameterization: Stochastic Maximum Likelihood Solution", IEEE Sixth SP Workshop on Statistical Signal and Array Processing, 1992, pp. 304–307.*
Ottersten, Bjorn et al, "Robust Source Localization Based on Local Array Response Modeling", IEEE, 1992, pp. II–441 thru II–444.*
Schmidt, Ralph O., "Multilinear Array Manifold Interpolation", IEEE Trans. on Signal Processing, vol. 40, No. 4, Apr. 1992, pp. 857–866.*
Pierre, J. et al, "Experimental Performance of Calibration and Direction–Finding Algorithms", IEEE, 1991, pp. 1365–1368.*
Wax, Mati et al, "On Unique Localization of Multiple Sources by Passive Sensor Arrays", IEEE Trans. on Acoustics, Speech, and Signal Processing, vol. 37, No. 7, Jul. 1989, pp. 996–1000.*

* cited by examiner

*Primary Examiner*—Gregory C. Issing
(74) *Attorney, Agent, or Firm*—Lumen Intellectual Property Services, Inc.

(57) ABSTRACT

A method and apparatus are provided for easily and accurately calibrating an antenna array in a multipath environment. A calibration table containing spatial signature data together with corresponding location data is used to calibrate the antenna array, i.e. to determine the array response in various directions. The calibration table includes a set of calibrated signal covariances $R_1, \ldots, R_N$ together with a set of N corresponding geographical locations. From this data, a set of array calibration vectors $\{a(\theta)\}$ is determined, where each vector $a(\theta)$ characterizes the complex signal response of the antenna array in the direction $\theta$. Once the array calibration vectors are determined, this information can be used for direction finding, beamforming, and other enhancements to the performance of the communication system.

6 Claims, 3 Drawing Sheets

ANTENNA ARRAY CALIBRATION IN WIRELESS COMMUNICATION SYSTEMS

This application is a continuation-in-part of U.S. Pat. No. application Ser. No. 08/780,565, filed Jan. 07, 1997, now U.S. Pat. No. 6,026,304 which is incorporated herein by reference.

FIELD OF THE INVENTION

This invention relates generally to methods for calibrating an antenna array. More particularly, it relates to methods for determining antenna array calibration vectors from location-finding data.

BACKGROUND OF THE INVENTION

Wireless radio communication systems, such as cellular telephone networks, sometimes make use of phased arrays of antennas to provide spatial diversity, direction-finding, and increased capacity. Normally, however, it is necessary to calibrate each antenna array in order to determine its response to signals originating from various different directions. Only after the array response is known is it possible to use the array. A common technique for calibrating an antenna array involves collecting test signals from transmitters having known angular locations relative to the array. Yet, for this technique to be effective it is required that the signal propagation from these locations to the array is free of multipath. Many wireless environments, however, are characterized by a significant amount of multipath. Consequently, the calibrated array response will be inaccurate, and appropriately compensating for the multipath errors can be an inconvenient and time-consuming task, if possible at all. Accordingly, it would be desirable to have an improved method for calibrating antenna arrays.

SUMMARY OF THE INVENTION

Accordingly, it is a primary object of the present invention to provide a method and apparatus for easily and automatically calibrating an antenna array. Another object of the present invention is to provide a technique for determining the response of an antenna array used in a wireless communication system. In one aspect of the invention, a method is provided for calibrating an antenna array through the use of data provided by a calibration table containing spatial signature data together with corresponding location data. In the present invention, a method is provided to use this information to calibrate the antenna array, i.e. to determine the array response in various directions. In one embodiment of the invention, a calibration table includes a set of calibrated signal covariances $R_1, \ldots, R_N$ together with a set of N corresponding geographical locations. From this data, a set of array calibration vectors $\{a(\theta)\}$ can be determined, where each vector $a(\theta)$ characterizes the complex signal response of the antenna array in the direction $\theta$. Once the array calibration vectors are determined, this information can be used for direction finding, beamforming, and other enhancements to the performance of the communication system.

DETAILED DESCRIPTION

Although the present detailed description contains many specifics for the purposes of illustration, anyone of ordinary skill in the art will appreciate that many variations and alterations to the details are within the scope of the invention. Accordingly, the following embodiments of the invention are set forth without any loss of generality to, and without imposing limitations upon, the claimed invention.

Figure 1:
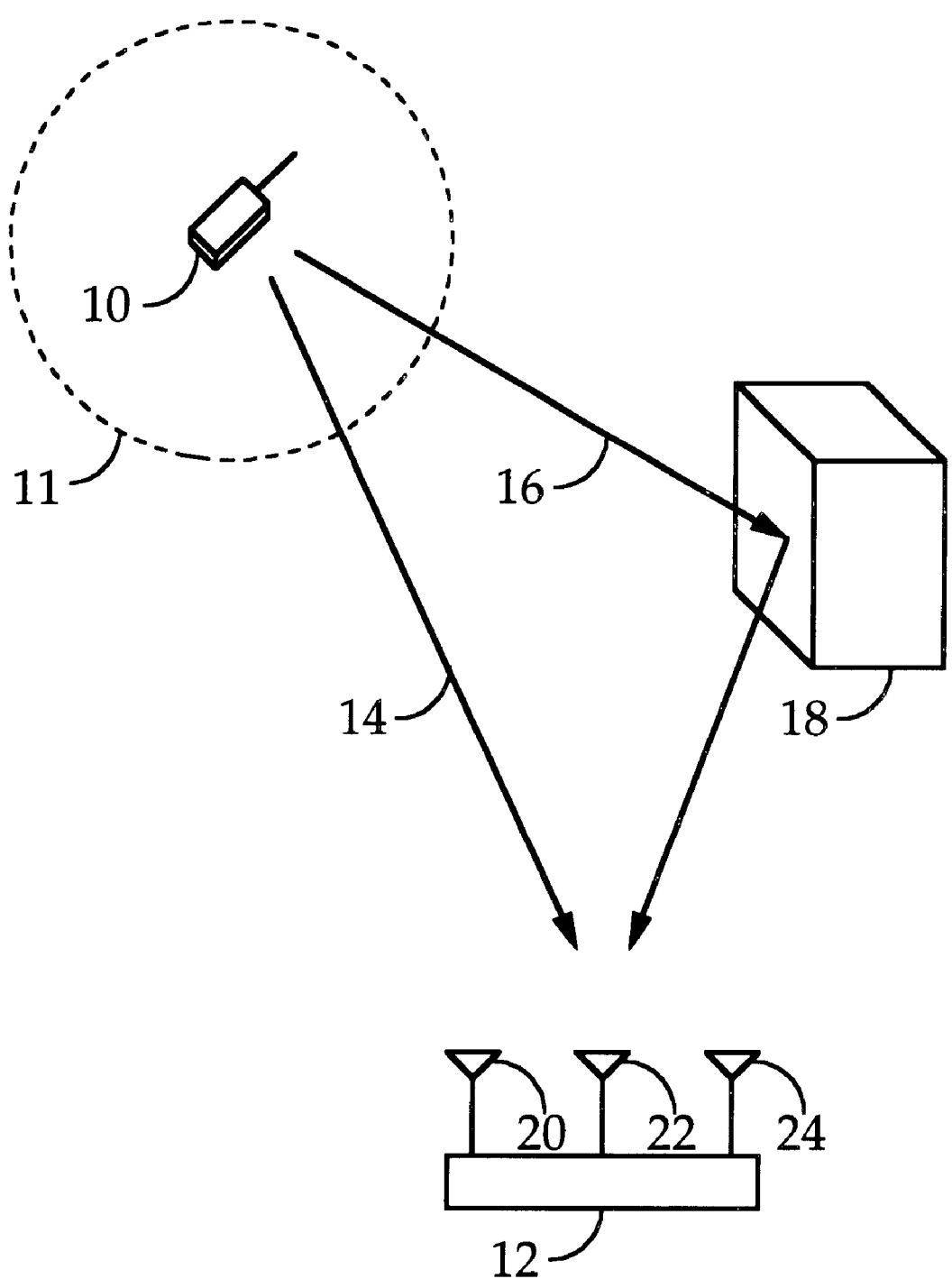
FIG. 1 illustrates a wireless communication system according to the present invention.

In a communication system according to a preferred embodiment of the invention, a cellular telephone 10 transmits a signal which travels through an environment and couples to an array of antennas 20, 22, 24 of a cellular telephone base station 12, as shown in FIG. 1. Typically, in addition to a direct path signal 14 from phone 10 to base 12, there may be additional multipath signals reflected from various environmental objects, for example, multipath signal 16 reflected from object 18. In addition, there are typically various smaller local scatterers (not shown) positioned within a region 11 around phone 10. Consequently, signals 14 and 16 may comprise components corresponding to these scattered signals.

Figure 2:
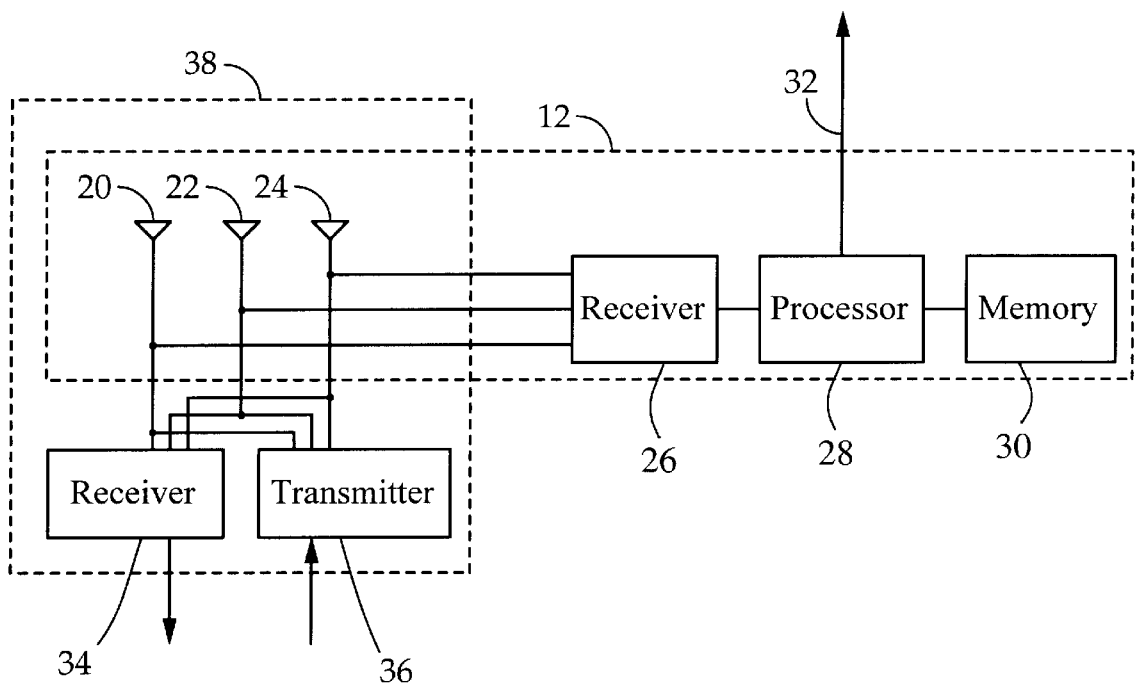
FIG. 2 is a block diagram of an apparatus and base station according to the present invention.

As shown in FIG. 2, an array calibration apparatus 12 includes a conventional multichannel receiver 26 which coherently receives signals from the antennas 20, 22, 24. The received signals are sent to multi-purpose signal processor 28 which performs any required processing as will be described in detail below. A memory device 30 is accessible by processor 28 and is used to store signal signature calibration data, location data, and/or other data as required. If desired, information determined by processor 28 may be sent over external communication lines 32 for use by other systems. In the present embodiment, array calibration apparatus 12 shares antennas with an existing cellular telephone base station 38, which has a multi-channel receiver 34 and multi-channel transmitter 36, among other components well-known in the art (not shown). Note, however, that array calibration apparatus 12 need not be connected to an existing cellular base station 38, but can operate as a standalone device with its own antennas. In this case, the apparatus would typically provide additional functionality that makes use of the array calibration information, e.g. direction finding and beamforming.

In general, the base station 12 has a number p of antennas forming an array. For illustrative purposes, however, the array is shown in the figures as having three antennas 20, 22, and 24. The p antennas are used to receive complex signal envelopes $x_1(t), x_2(t), \ldots, x_p(t)$, respectively, which are conventionally grouped together to form a p-dimensional array vector $x(t) = [x_1(t), x_2(t), \ldots, x_p(t)]^T$. In general, the dimension of the array vector $x(t)$ is equal to p, the number of antennas in the array.

In a preferred embodiment, a batch of 100 array vectors is sampled in a 1 ms interval, and the outer products of these 100 vectors are combined to form a p×p covariance matrix for the batch. Since a batch needs to be collected only once every 50 ms, and each batch spans only 1 ms, there is sufficient time using this technique to sample up to 50 different channels in a 50 ms interval. Those skilled in the art will appreciate that similar sampling methods may also be implemented using various other values for the time intervals, number of array vectors sampled per batch, etc. Although the present description is focused upon the processing of one signal, in the preferred embodiment, the techniques described herein can be applied in parallel to signals on up to 50 channels. It will be recognized by those skilled in the art that although this sampling procedure is appropriate for the AMPS cellular standard it can be adapted to various other modulation schemes as well. In the case of a CDMA cellular network, for example, spread spectrum signals from the antenna array are digitized and passed through synchronized multichannel despreaders to produce the p-dimensional array vectors x(t) corresponding to each mobile. These vectors can then be sampled and used to form a covariance matrix for each batch in the manner outlined above. For a given mobile, a collection of the covariance matrices for various batches are then averaged over the course of a few seconds to form a pxp signal covariance matrix, R, which is normalized such that Tr R=1. This normalized covariance matrix is stored in a calibration database containing N calibrated signal signatures and associated locations, as shown in TABLE 1.

TABLE 1

| Location | Signal Signature | |
|---|---|---|
| (x, y, z) | Subspace | Covariance |
| $d_1$ | $U_1$ | $R_1$ |
| . | . | . |
| . | . | . |
| . | . | . |
| $d_N$ | $U_N$ | $R_N$ |

The locations $d_1, \ldots, d_N$ may be two or three dimensional, and may be assigned a date upon which it was last calibrated. Each location $d_i$ has an associated signal signature that characterizes the structure of the signal from that location.

This signal signature may include information such as a signal subspace $U_i$ and a calibrated covariance matrix $R_i$.

Although this database may be generated by various techniques, in the preferred embodiment it is generated by an empirical calibration procedure, as follows. A cellular phone and a global positioning system (GPS) receiver are placed in a vehicle which moves to various locations in a geographical region of interest. The GPS data are periodically stored and time-stamped using the GPS clock. Meanwhile, the transmitted signal from the cellular phone is received at the base station, which is also equipped with a GPS receiver, and the signal covariance matrix R is also time stamped with the GPS clock and stored. When the mobile returns, the stored data is post-processed using differential GPS correction data obtained from the base station to determine with high accuracy the location corresponding to each covariance matrix R. This data is then used to construct the calibration table database.

The signal subspace $U_i$ for a location is determined from the dominant eigenvectors of $R_i$. The dominant eigenvectors are defined as the eigenvectors of $R_i$ corresponding to the largest eigenvalues that collectively capture at least certain amount, e.g. 90%, of the total signal energy. It should be emphasized that the signal subspace may be determined by various different criteria as well.

Figure 3:
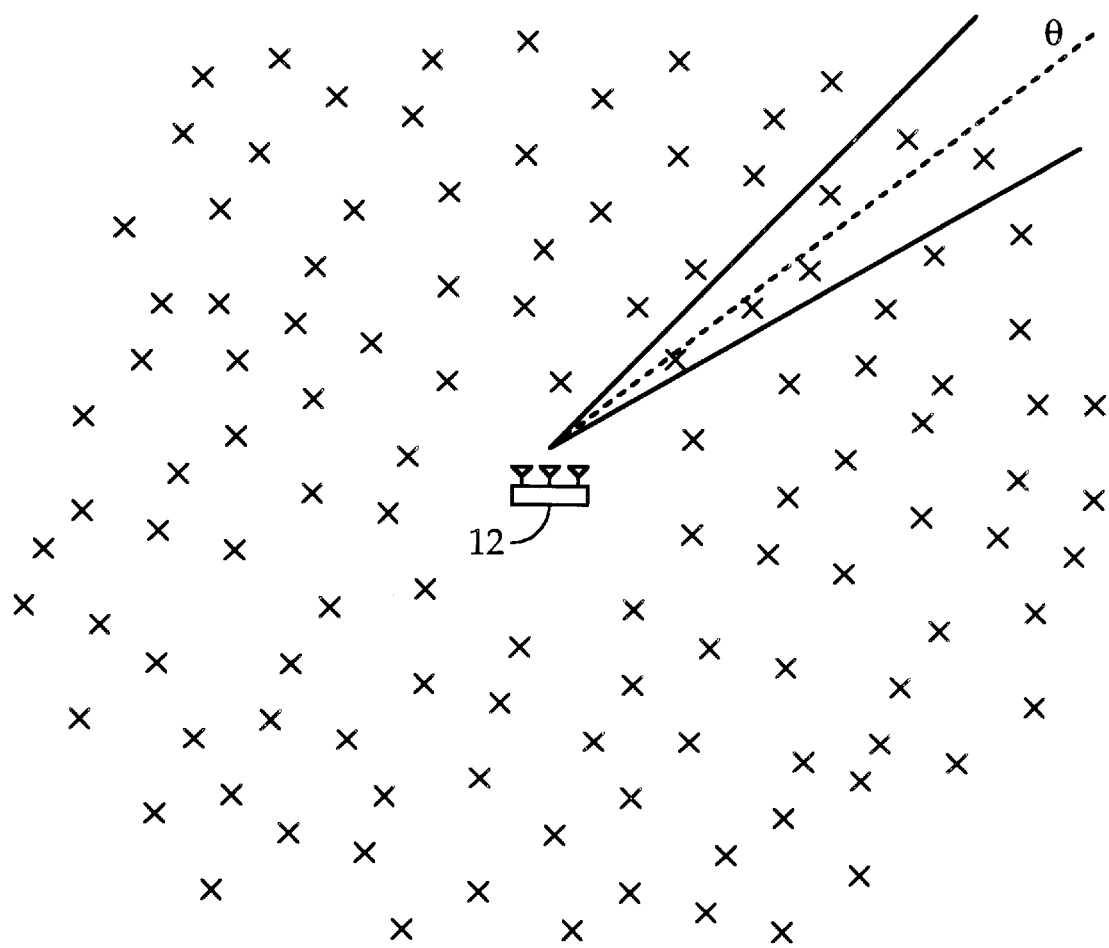
FIG. 3 is a picture of an angular sector of a base station service area containing various calibrated locations, in accordance with the invention.

According to the present invention, a set of array manifold vectors $\{a(\theta))\}_{\theta=1, \ldots, 360}$ may be determined from the signature calibration table, as follows. As described earlier, the service region contains a set of calibrated locations, represented in FIG. 3 by "X" marks. Consider an angular sector of the service region of a base station 12, as shown in FIG. 3. The angular sector has an angular width $\Delta\theta$ and is centered around an angle $\theta$. In the preferred embodiment the value for $\Delta\theta$ is one degree. This particular value, however, is not necessary for the practice of the present invention, and various other values will work as well. Contained within this sector are several calibrated locations $d_1, \ldots, d_K$, having corresponding calibrated signature covariances $R_1, \ldots, R_K$. After these covariances have been identified for a given sector, each covariance $R_i$ is examined to determine if its largest eigenvalue has a magnitude significantly larger than the other eigenvalues. In the preferred embodiment, the largest eigenvalue exceeds the other eigenvalues by a factor of four, although other factors may also be used. For example, if the largest eigenvalue exceeds the next largest eigenvalue by a predetermined factor, then it is considered to be significantly larger than all the other eigenvalues, and is called a dominant eigenvalue. The result of this examination of the covariances results in a set of dominant eigenvalues and their corresponding eigenvectors. For example, if all the covariances have significantly large first eigenvalues, then the set of dominant eigenvectors will contain one eigenvector from each covariance, $e_1, \ldots, e_K$. These eigenvectors are then combined to form an average eigenvector for the sector, $e_{av}$. Various techniques can be used to determine $e_{av}$ from $e_1, \ldots, e_K$. For example, the K eigenvectors can be stacked in a matrix, and the singular value decomposition of the matrix can be calculated to determine the best rank-1 approximation to the matrix. This best rank-1 approximation is then used as the value for $e_{av}$. A more accurate estimate of $e_{av}$ can be determined by using the initial estimate of $e_{av}$ to exclude some outlying eigenvectors from the set of K eigenvectors and then repeating the procedure. The final value of $e_{av}$ for the sector is used as an initial estimate for the array calibration vector $a(\theta)$ for the sector. This estimate may be improved by imposing a continuity condition on the values of $a(\theta)$ with respect to $\theta$. The above procedure, therefore, can derive a set of array calibration vectors for the base station, which may be stored by the location finding system in a table, as shown in TABLE 2 below.

TABLE 2

| Direction $\Theta$ | Array Calibration Vector $a(\Theta)$ |
|---|---|
| 1 | a(1) |
| . | . |
| . | . |
| . | . |
| 360 | a(360) |

It should be noted that the above technique for generating array calibration vectors from the location database has several important advantages over known methods of generating array calibration vectors. It should be noted that prior techniques typically require that the array be installed and measured in a special antenna range. The known methods are not useful, therefore, with many existing antenna arrays. The present method, on the other hand, is effective with existing antenna arrays since no restriction is being made on the nature of the array or its supporting structure. Another type of prior technique typically requires providing transmitters in known locations around the array such that the propagation from the locations to the array is free from multipath. The selection and verification of such locations is very time consuming and complicated. The present method, on the other hand, makes no requirements on the transmitter locations and is very effective and straightforward in its data collection and processing.

Once the set of array manifold vectors $\{a(\theta)\}_{\theta=1, \ldots, 360}$ has been determined, the set can be used for location finding, direction finding, or to improve or enhance the performance of the system in other ways that are well known in the art.

It should be noted that the foregoing details may be varied in many ways without departing from the general spirit and scope of the invention. Accordingly, the scope of the present invention should be determined from the following claims and their legal equivalents.

What is claimed is:

1. In a system for wireless transmitter location finding, a method for determining a response of an antenna array, the method comprising:
   (a) measuring from the array a set of N spatial signatures associated with a set of N calibrated transmitter locations, wherein the spatial signatures comprise multipath signal information; and
   (b) calculating from the spatial signatures and calibrated locations a set of array calibration vectors $\{a(\theta)\}$, where each vector $a(\theta)$ characterizes the complex signal response of the antenna array in the direction $\theta$.

2. The method of claim 1 wherein the set of N spatial signatures comprises a set of N signal covariances.

3. The method of claim 2 wherein calculating the set of array calibration vectors $\{a(\theta)\}$ comprises selecting a subset of the calibrated locations contained within an angular sector centered around an angle $\theta$, and estimating from a subset of signal covariances associated with the subset of locations an array calibration vector $a(\theta)$ for the angular sector.

4. The method of claim 3 wherein estimating the array calibration vector comprises selecting a set of dominant eigenvectors from the subset of signal covariances, combining the dominant eigenvectors to form an average eigenvector for the sector.

5. The method of claim 4 wherein combining the dominant eigenvectors comprises stacking the eigenvectors in a matrix and calculating the best rank-1 approximation to the matrix.

6. The method of claim 5 wherein combining the dominant eigenvectors further comprises using the best rank-1 approximation to exclude some outlying eigenvectors from the set of eigenvectors.

* * * * *